United States Patent Office 3,282,863
Patented Nov. 1, 1966

3,282,863
RESIN FOAMS
James E. Carey, Millburn, and Paul D. Jones, Union,
N.J., assignors to Shell Oil Company, New York, N.Y.,
a corporation of Delaware
No Drawing. Filed Dec. 1, 1961, Ser. No. 156,494
18 Claims. (Cl. 260—2.5)

This application is a continuation-in-part of copending application Serial No. 826,902, filed July 14, 1959, now abandoned.

This invention relates to an expanded cellular resinous material and to a method of producing such an expanded cellular resinous material. More particularly, this invention relates to a method of producing expanded cellular epoxy resin compositions and to compositions produced according to such method.

It has been known heretofore to produce expanded cellular resinous materials by a variety of methods. It has also been known to produce expanded cellular epoxy resin materials. Cellular epoxy resin materials heretofore have been prepared by using as internal "blowing agents" compounds which undergo thermal decomposition, producing a gas when the resin mass is heated or develops heat.

A drawback of the use of the conventional chemical internal blowing agents is that these materials are present in the resin mixture as discrete solid particles. It is difficult to assure their even distribution in the resin mixture. The production of epoxy resin foams of uniform fine cell structure is, therefor, virtually impossible when using them. It is also virtually impossible to produce epoxy resin foams of very low density, e.g., between 1 and 5 pounds per cubic foot in a practical manner by the methods known to the art. Such low density foams are, however, readily produced according to this invention.

It is an object of this invention to provide a method for producing foamed cured epoxy resins in which use of compounds which release gas by chemical action is avoided.

It is a specific object to provide a convenient method for the production of cured epoxy resin foams of uniform fine cell structure.

It is another specific object to provide a method for producing strong cured epoxy resin foams having densities as low as about 1 pound per cubic foot.

Other specific objects are:

To provide resin composition which are stable on storage and which can be readily expanded and cured to produce cured epoxy resin foams;

To provide cured epoxy resin foams having low density, high thermal insulating value, high dimensional stability and other characteristics required for use in insulation of refrigerators, and methods of preparing such foams;

To provide cured epoxy resin foams having low density, high thermal insulating value, self extinguishing characteristics, and toughness at extremely low temperatures required for insulating industrial cold storage vessels.

Other objects of this invention will appear from the following description thereof.

Cellular resin materials produced according to the process of this invention may have a variety of desirable characteristics depending upon the specific formulation employed. Thus, the resins may be of very low density for the type of use where space-filling, thermal, and/or acoustical insulation is required, as in walls, ceilings, panels, tank or ship insulation, etc., or the cured foams may be applied in uses wherein they serve as structural load-assuming sections or components as in laminated sandwich-type panels, internally-filled and reinforced elements, or both as insulating and load-assuming materials as in refrigerator insulation, building panels, etc.

Cured resins produced according to this invention have good electrical and mechanical properties, thus making them particularly adaptable for such uses as electrical potting materials and in applications such as the fabrication of radar housings, aircraft components and guided missile parts.

The difficulties of the prior art methods of producing foamed epoxy resins are overcome according to this invention by preparing a liquid mixture containing at least (a) as its essential resin component a polyepoxide having an epoxy equivalent greater than 1.0 and (b) a fluid which is completely soluble in the liquid mixture at atmospheric temperature but which vaporizes therefrom at elevated temperatures, blending with said mixture a fast-acting epoxy curing agent, placing the resulting mixture into a space where foam is desired, and permitting the heat released by the curing reaction to vaporize said fluid, resulting in a cured epoxy resin foam.

In a preferred mode of practicing this invention a liquid mixture containing at least (a) as its essential resin component a polyepoxide having an epoxy equivalent greater than 1.0 and (b) a fluid which is completely soluble in the liquid mixture at atmospheric temperature but which vaporizes therefrom at elevated temperatures, is blended with an amount of a normally gaseous fluid sufficient to nucleate such mixture and with a fast acting epoxy curing agent, the resulting mixture is placed into a space where foam is desired, and the heat released by the curing reaction is permitted to vaporize said soluble fluid. The result is a cured epoxy resin foam.

MATERIALS USED

*Polyepoxides*

The polyepoxides to be used in preparing the compositions of the present invention comprise those materials possessing more than one vicinal epoxy group, i.e., more than one

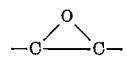

group per molecule. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is well known. It is described, for example, in U.S. 2,633,458 to Shokal. The polyepoxides used in the present process are those having an epoxy equivalency greater than 1.0.

In the expansible compositions of this invention, the polyepoxides used may be of a single type or may be mixtures of several different types or molecular weights. Although some normally solid components may be included, the total mixture is in each case a liquid. For purposes of describing and claiming this invention, normally liquid polyepoxides are those having a Durrans mercury method softening point of up to about 30° C. and normally solid polyepoxides are those which have a higher softening point.

The polyepoxides that are particularly preferred as the major ingredient of the compositions of the invention are the glycidyl ethers and particularly the normally liquid glycidyl ethers of polyhydric phenols or polyhydric alcohols. The glycidyl ethers of polyhydric phenols are obtained by reacting epichlorohydrin with the desired polyhydric phenols in the presence of alkali. Polyether A and polyether B described in Shokal, U.S. 2,633,458, are good examples of polyepoxides of this type. Other examples include the polyglycidyl ether of 1,1,2,3,-tetrakis-(4-hydroxyphenyl)ethane (epoxy value of 0.45 eq./100 g. and melting point 85° C), polyglycidyl ether of 1,1,5,5-tetrakis(hydroxyphenyl)pentane (epoxy value 0.514 eq./100 g.) and the like and mixtures thereof.

Another useful group of polyepoxides are epoxidized polyethylenically unsaturated hydrocarbons, such as epoxidized 2,2 - bis(2-cyclohexenyl)propane, epoxidized vinylcyclohexene and epoxidized dimer of cyclopentadiene.

Another useful group comprises the epoxidized polymers and copolymers of diolefins, such as butadiene. Examples of this include, among others, butadiene-acrylonitrile copolymers (Hycar rubbers), butadiene-styrene copolymers and the like.

Another useful group comprises glycidyl-containing nitrogen compounds, such as diglycidyl aniline and di- and triglycidylamine.

A useful group of polyepoxides which can be used in the liquid, expansible composites of this invention are halogenated derivatives of the above described polyepoxides. For example, the diglycidyl ether of 2,2-bis-(4-hydroxy-3,5 - dibromophenyl)propane or the corresponding tetrachloro substituted compound may be used as all or part of the resin component of the expansible liquid resin mixture. Similarly resins prepared like polyethers A, B or D of said Shokal patent but with tetrachloro- or tetrabromo-bisphenol A substituted for the bisphenol of Shokal may be used.

Epoxy esters

A class of polyepoxides which have special characteristics and special utility in this invention consists of epoxy esters; of this group, epoxy esters of dimers and trimers of long chain unsaturated acids have unique properties as explained hereinafter. The latter esters are described in some detail in patent application Serial No. 666,238, filed June 17, 1957, by H. A. Newey, now U.S. Patent No. 2,940,986.

One of the benefits due to use of the epoxy esters of said Newey patent in compositions according to this invention, when used in substantial amounts, e.g., about 2 percent or more, is that they provide improved flexibility or resilience of the foamed products. Foamed epoxy resins of the prior art have been generally characterized by exteme friability or brittleness. It has now been found that inclusion of at least about 2 percent or epoxy esters in the foam composition overcomes this very undesirable characteristic.

The addition of even very small amounts of epoxy esters of said Newey patent, e.g., as little as 0.5 to 0.75%, has the further pronounced advantage of greatly improving the uniformity and fineness of cell structure in the resulting foams. In the absence of such an amount of said esters, it is necessary to add wetting agents to secure these properties. Wetting agents, however, are not converted to polymers and their presence in the finished product is sometimes objectionable. By inclusion of epoxy esters of said Newey patent, which react to form part of the final foam structure, it is possible to produce foams of extremely fine, uniform cell structure without addition of wetting agents. Maximum improvement is obtained with amounts in the range from 0.5 to 3 percent of ester. Greater amounts, while sometimes desirable, do not provide substantial further improvements in uniformity and fineness of cell structure.

Epoxy esters as a class also have a pronounced, quite unexpected effect on the foam curing process and on the dimensional stability and maintenance of low thermal conductivity of the cured foam. It has been found that the presence of about 2 percent by weight or more of epoxy ester in the reaction mixture causes the resulting foam rise to be less "stiff." "Stiffness" of foam rise is observed as failure to fill forms or molds and failure of the last-expanded portions to adhere to adjacent surfaces. It is believed that this effect results from too rapid a completion of the epoxy resin curing reaction. It has been found that the beneficial effect of epoxy esters in producing a fluid rather than a stiff foam rise is not due to any surfactant effect (since it cannot be duplicated by replacing the ester by a surfactant), but rather to an effect the esters exert in reducing the rate of disappearance of epoxy groups from the mixture enough to maintain some uncured epoxy groups in the foam until the rise is complete. It has been found that there is a critical upper limit of concentration of epoxy esters in compositions which are to have the dimensional stability and retention of insulating ability required for refrigerator liners, as described in more detail hereinafter. The upper limit is at about 5%; preferably the maximum content of epoxy esters in refrigerator liner foam compositions is held at about 3–4%. The cure delaying effect of epoxy esters in many cases results in a final product which is more completely cured than the same composition would be without the ester. For example, a liquid foam composition of high functionality that rises rapidly will gel into an expanded structure before cure is complete and is then sufficiently rigid to reduce further reaction between available functional groups to an impractically low rate. The presence of relatively slow-reacting epoxy ester delays the gel point sufficiently to permit fluid rise and substantially complete cure.

Another group of epoxy esters include the epoxidized esters of unsaturated monohydric alcohols and polycarboxylic acids having the epoxy group in an internal open-chain portion of the molecule, such as, for example, di(2,3-epoxybutyl)adipate, di(2,3-epoxybutyl)oxalate,
di(2,3-epoxyhexyl)succinate,
di(2,3-epoxyoctyl)pimelate,
di(2,3-epoxybutyl)phthalate,
di(2,3-epoxyoctyl)tetrahydrophthalate,
di(4,5-epoxydodecyl)maleate,
di(2,3-epoxybutyl)terephthalate,
di(2,3-epoxypentyl)thiodipropionate,
di(5,6-epoxytetradecyl)diphenyldicarboxylate,
di(3,4-epoxyheptyl)sulfonyldibutyrate,
tri(2,3-epoxybutyl)1,2,4-butanetricarboxylate,
di(5,6-epoxybutyl)azelate,
di(3,4-epoxybutyl)citrate,
di(5,6-epoxyoctyl)cyclohexane-1,3-dicarboxylate,
di(4,5-epoxyoctadecyl)malonate.

Another group of esters includes the epoxidized ester of unsaturated monohydric alcohols and polycarboxylic acids having the epoxy group in the terminal position of an open chain portion of the molecule, such as for example:

di(2,3-epoxypropyl)adipate,
di(2,3-epoxypropyl)oxalate,
di(5,6-epoxyhexyl)succinate,
di(3,4-epoxybutyl)maleate,
di(7,8-epoxyoctyl)pimelate,
di(3,4-epoxybutyl)phthalate,
di(2,3-epoxypropyl)tetrahydrophthalate,
di(2,3-epoxypropyl)maleate,
di(2,3-epoxypropyl)terephthalate,
di(4,5-epoxypentyl)thiodipropionate,
di(13,14-epoxytetradecyl)diphenyldicarboxylate,
di(6,7-epoxyheptyl)sulfonyldibutyrate,
tri(2,3-epoxypropyl)1,2,4-butanetricarboxylate,
di(4,5-epoxypentyl)tartarate,
di(2,3-epoxypropyl)azelate,
di(2,3-epoxypropyl)citrate,
di(2,3-epoxypropyl)cyclohexane-1,3-dicarboxylate,
di(17,18-epoxyoctadecyl)malonate.

Further esters of this type are those described in U.S. 2,895,947 to Shokal et al., namely, esters of epoxy subsituted monohydric alcohols and acid components of the group consisting of aromatic polycarboxylic acids and acid esters of these acids and polyhydric compounds wherein at least two of the carboxyl groups of the acid components are esterified with the epoxy alcohol. Preferred esters of this type are di(2,3-epoxypropyl)terephthalate, di(2,3-epoxypropyl)chloroterephthalate, di(3,4-epoxyhexyl)isophthalate, di(3,4 - epoxycyclohexyl)orthophthalate, di(epoxypropoxyethyl)-2-methyl-terephthalate, and the like.

Another group of suitable epoxy esters includes epoxidized esters of unsaturated alcohols and unsaturated carboxylic acids, such as 2,3-epoxybutyl-3,4-epoxypentanoate, 3,4 - epoxycyclohexanoate, 3,4-epoxycyclohexyl-4,5-epoxyoctanoate, 2,3-epoxycyclohexylmethylepoxymethylcyclohexane-carboxylate.

Still another group of suitable epoxy esters includes epoxidized derivatives of polyethylenically unsaturated polycarboxylic acids such as, for example, dimethyl-8,9,12,13-diepoxyeicosanedioate,
dibutyl-7,8,11,12-diepoxyoctadecanedioate,
dioctyl-10,11-diethyl-8,9-12,13-diepoxyeicosanedioate,
dihexyl-6,7,10,11-diepoxyhexadecanedioate,
didecyl-9-epoxyethyl-10,11-epoxyoctadecanedioate,
dibutyl-3-butyl-3,4,5,6-diepoxycyclohexane-1,2-dicarboxylate,
dicyclohexyl-3,4,5,6-diepoxycyclohexane-1,2-dicarboxylate,
dibenzyl-1,2,4,5-diepoxycyclohexane-1,2-dicarboxylate, and
diethyl-5,6,10,11-diepoxyoctadecyl succinate.

Still another group of epoxy esters comprises the epoxidized polyesters obtained by reacting a polyhydric alcohol and polycarboxylic acid or anhydride in which either one or both compounds are unsaturated, such as, for example, the polyester obtained by reacting 8,9,12,13-eicosadienedioic acid with ethylene glycol, the polyester obtained by reacting diethylene glycol with 2-cyclohexene-1,4-dicarboxylic acid and the like, and mixtures thereof.

Curing agents

A curing agent is required to convert the wet epoxy resin composition into a hard, dry, stable cross-linked resin. A great variety of different curing agents for curing epoxy resins are known. Many curing agents are disclosed, for example, in "Epoxy Resins—Their Applications and Technology" by Lee et al., McGraw-Hill Book Co., Inc., 1957, in chapters 3–5. Such agents include among others, carboxylic acids or anhydrides, such as oxalic acid or phthalic anhydride; Friedel-Crafts metal halides, such as aluminum chloride, zinc chloride, ferric chloride or boron trifluoride as well as complexes or addition compounds thereof with water, glycols, ethers, amines, phenols, acid anhydrides, ketones, aldehydes, diazonium salts and the like; phosphoric acid and partial esters thereof including n-butyl orthophosphate, diethyl orthophosphate, and hexaethyltetraphosphate; primary, secondary and tertiary amines and amino compounds, such as triethylamine, ethylene diamine, diethylamine, diethylene triamine, triethylene tetraamine, n-phenylenediamine, dicyandiamide and melamine; salts of inorganic acids, such as zinc fluoborate, potassium persulfate, nickel fluoborate and magnesium perchlorate; combinations of metal salts with tertiary amines, and the like.

Of the numerous curing agents which are useful in the curing of epoxy resins, those may be employed in the present invention which act sufficiently rapidly so that when the mixture of resin, curing agent and inert vaporizable fluid is brought together the curing reaction begins quickly and proceeds rapidly so the heat resulting from the curing action is not dissipated. Generally, temperatures during the cure may be as high as 220° C.

Very fast-acting curing agents give particularly outstanding results in this invention. Such compounds, for example, initiate curing within 30–60 seconds unless modified, and result in substantially complete cures within 2 to 4 minutes. They do necessitate extreme speed in preparing the blended foamable mixture and cause very rapid heat release during the curing step thus causing a substantial rise in temperature and consequent expansion of the foam.

A particularly suitable group of fast-acting curing agents for use in this invention consists of $BF_3$ and addition products or complexes of $BF_3$ with water, or with organic compounds. These complexes are also known as coordination compounds (Encyclopedia of Chemical Technology, Kirk-Othmer, vol. 6, 1951, p. 680). The $BF_3$ is suitable present in those products in from 1% to 70% concentration.

Especially outstanding results are obtained with compositions comprising a $BF_3$ addition product such as $BF_3$-dihydrate or $BF_3$-etherate, dissolved in polyhydric polyethers, such as polyethylene glycol. The concentrations of $BF_3$ in such compositions is suitably from 1 to 20%, but preferably about 8 to 10%.

Addition products of $BF_3$ with other oxygen-containing or nitrogen-containing compounds, e.g., with phenols, esters, other ethers, amines, and anhydrides may also be employed in some instances. Such addition products are referred to for example in U.S. 2,717,885, 2,824,083, and 2,839,495.

For purposes of describing and claiming this invention, a fast-acting curing agent is a compound, complex or mixture which initiates an exothermic epoxy curing reaction within 10 minutes (maximum) for the time of admixture with the polyepoxide-containing composition.

A different type of epoxy resin foam composition, which has other unusual and superior properties, is produced by utilizing phosphoric acid as curing agent. Particularly superior results are obtained by utilizing phosphoric acid as a partial ester with polyglycols, such as, for example, dipropylene glycol. Other partial esters of phosphoric acid are suitable, such as beta-hydroxyethyl ortho acid phosphate, n-butyl orthophosphate, diethyl orthophosphate and hexaethyltetraphosphate. Partially halogenated esters of phosphoric acid, e.g., tris(2,3-dibromopropyl)phosphate or the corresponding chlorinated compound are suitable adjuncts for such curing agents.

It is found that epoxy resin compositions cured with phosphoric acid-containing curing agents of the type described are highly resistant to flame propagation. With these curing agents, foamed resins can be prepared which are classified as self-extinguishing according to ASTM D169259T.

As explained hereinatfer, slower-acting curing agents, e.g., aliphatic amines such as diethylene triamine, may also be employed in some instances according to this invention.

The amount of the curing agents employed may vary over a considerable range, such as from 1% to 200% by weight of the polyepoxide, with the exact range depending on the particular type of agent selected. In most cases satisfactory cures are obtained with amounts varying from about 1% to about 25% by weight of the materials being polymerized. With boron trifluoride complexes and with phosphoric acid and esters thereof preferred amounts vary from about 1% to about 10% by weight. With curing agents having replaceable hydrogen, such as the amine agents, amounts of agent generally employed vary up to and include equivalent proportions, i.e., sufficient curing agent to furnish a replaceable hydrogen atom for every epoxy group to be reacted.

The amino compounds are preferably employed in amounts varying from about 3% to about 25%. With salts of the inorganic acids, such as the salts of fluoboric acid amounts varying from about 3% to 20% by weight preferably are employed. Other curing agents are preferably employed in amounts varying from 1% to 80% by weight.

Water

In the production of epoxy resin foams having the required dimensional stability and permanence of insulating capacity for use as refrigerator liner, it is essential for best results with $BF_3$ or its complexes as sole curing agent to maintain the content of water in the total foamable composition in a critical, low range. In order to obtain results which meet the requirements of a commercial refrigeration insulating foam, the water content of the total system must be held to a value not above 0.10% by weight, based on the total mixture of resin, expanding agent and curing agent.

One of the effects of water is to relay the onset of foam rise. When using a $BF_3$-polyethylene glycol mixture with 0.05–0.08 percent water, foam rise begins about 25 to 30 seconds after admixing the curing agent. While lower amounts of water, from 0.03 to 0.05 percent, can be used, the resulting interval between admixing of curing agent and initiation of foam rise is so short that very skillful handling of the mixture is required for good results. In order to control the total water content of the mixture, it is important to use a $BF_3$ complex which is substantially free of water. $BF_3$ etherate complex is preferred. It is particularly preferred to employ as curing agent a solution of $BF_3$-etherate complex in a polyethylene glycol. Typical suitable compositions are described hereinafter. In the case of phosphoric acid-containing curing agents, the effect of water in foam initiation time is not quite so critical; the total composition may contain water in the range of 0.03 to 0.3% by weight.

Cure accelerators

It may at times be desired to accelerate the rate of cure, when amine curing agents are used, by the addition of known accelerators such as phenol or phenolic compounds. From 0.1% to 20% by weight or more of a phenol, based on the resin, may be employed. The larger proportions are particularly suitable in compositions in which the major resin compound is an epoxy ester.

Thixotropic agents

If desired, a thixotropic agent may be added to the foam-producing mixtures of this invention. Thixotropy is the property of some gels of becoming fluids of relatively low viscosity when agitated but setting into relatively stable non-fluid masses when not agitated. The fluidity can be re-established by renewed agitation. Thixtropic agents impart thixotropy to materials to which they are added.

It is generally found that foams produced according to this invention are stable until cured even without the addition of a thixotropic agent, and such materials are therefore not included in the preferred formulations.

Thixotropic agents which can be employed in this invention, if desired, include many highly absorptive materials such as pigments, asbestos floc, silicate clays, micas, colloidal silica, organic complexes of bentonite, attapulgite, metallic soap powders, metallic leafing powders, finely-divided solidified vegetable oil derivatives, and the like.

A preferred thioxtropic agent, if any is to be used, is a material of the class of quaternary ammonium bentonite complexes. The bentonite complexes or salts are produced by the reaction of bentonite with organic bases or salts of organic bases through base exchange wherein the calcium, sodium, potassium, magnesium or other replaceable bases of the silicate of the bentonite enter into double decomposition with cations of organic bases. Such bentonite complexes are available under the trademark Bentone; the numerals following the name Bentone designate the number of carbon atoms in the quaternary compounds from which the bentonite complex is derived. They include:

(1) Bentone 26—dimethyl didodecyl ammonium bentonite.
(2) Bentone 27—dimethyl dodecyl tridecyl ammonium bentonite.
(3) Bentone 30—dimethyl dodecyl hexadecyl ammonium bentonite.
(4) Bentone 34—dimethyl dihexadecyl ammonium bentonite.
(5) Bentone 36—dimethyl hexadecyl octadecyl ammonium bentonite.
(6) Bentone 38—dimethyl dioctadecyl ammonium bentonite.

The bentonite compounds or complexes may be used individually or in suitable mixtures or blends in the liquid resin mixtures in the proportions of from 1 to 10 parts by weight for each 100 parts by weight of the total resin content of the mixture, a preferred range of proportions being between 1.5 and 7 parts by weight for each 100 parts by weight of the total polyepoxide resin content of the mixture.

Metallic soap powders suitable as thixotropic agents are metallic soap powders of fatty acids having from 12 to 20 carbon atoms such as: zinc stearate, aluminum stearate, calcium stearate, magnesium stearate, magnesium hydroxy stearate, barium stearate, zinc laureate, calcium oleate, and strontium stearate.

The proportion of metallic soap powder or blends of metallic soap powder employed may range from 0.2 to 12, and preferably 0.5 to 5 parts by weight for each 100 parts by weight of the total resin content of the reactant mixture.

Metallic leafing powders which are effective as thixotropic agents include: aluminum leafing powder, lead leafing powder, and stainless steel leafing powder. Typical metallic leafing powders are prepared by grinding a metallic powder and a stearate lubricant and thus contain also a metallic soap powder.

Another useful thixotropic agent is derived from the mineral attapulgite, a hydrated magnesium-aluminum silicate. Materials of this type are available under the trademark "Attasorb" and "Permagel." The avaliable materials are ground to a fineness of 90%–95% less than 10 microns and are composed of agglomerates of needle-like particles. The powders are light-weight, free-flowing and highly adsorptive.

A colloidal silica which is useful as a thixotropic agent is commercially available under the trade-mark "Cab-O-Sil." It is prepared in a hot gaseous environment by vapor-phase hydrolysis of a silicon compound and is characterized by high chemical purity, low water content, extremely great external surface area and a high degree of particle separation.

The thixotropic agent may also be a completely organic material. A suitable organic thixotropic agent, for example, is a finely-divided solidified vegetable oil derivative, available under the trade name "Thixcin." The solid has a specific gravity of 0.990 and is readily dispersed in non-aqueous liquids.

Expansion-providing fluids

Expansion of the liquid resin composition is provided in the process of this invention by a blowing agent which is a vaporizable fluid which is completely soluble in the liquid resin composition at atmospheric temperature but which vaporizes therefrom at elevated temperatures. The normal boiling point of such a fluid may be below atmospheric temperature provided it is sufficiently soluble in the resin composition so that it does not vaporize therefrom as long as the resin composition itself is at atmospheric temperature. The boiling point of the fluid may be between −30° and 100° C. and is preferably in the range between about 0° C. and about 50° C. When using fluids having higher boiling points, e.g., up to 60° C. to 100° C., extraneous heat is generally required to secure expansion in addition to the heat developed during the curing process. If desired, mixtures of fluids may be employed in which a lower boiling fluid provides the initial expansion and a higher boiling fluid provides further substantial expansion as the temperature of the total mixture rises. The chemical composition of the fluids employed is of not particular importance so long as they are not reactive with the remaining components of the resin mixture. Suitable fluids, for example, are hydrocarbons such as pentanes, hexanes, cyclohexane, petroleum ether, or the like, and substituted hydrocarbons, e.g., alcohols and halogen-substituted hydrocarbons. Some compounds which can be dissolved in the base resin mixtures and provide expansion by vaporization at elevated temperatures may have relatively high melting points, so that they are normally solids. The term "vaporizable fluids" includes such compounds, which are present in solution in the expandable composition.

Preferred vaporizable fluids are those polychlorofluoromethanes having boiling points in the desired range between −30° C. and 100° C. A series of chlorofluoroalkanes and alkenes is available under the trademarks "Freon" and "Genetron." Table 1 lists several such compounds which are suitable for use in the present invention. Other materials if this series having boiling points near or above atmospheric temperature may, however, also be employed.

TABLE 1

| "Freon" | "Genetron" | Formula | Boiling Point (° C.) |
|---|---|---|---|
| "Freon–11" | "Genetron–11" | CCl$_3$F | +23.7 |
| "Freon–12" | "Genetron–12" | CCl$_2$F$_2$ | −29.8 |
| "Freon–21" | | CHCl$_2$F | +8.9 |
| "Freon–114" | "Genetron–316" | CClF$_2$-CClF$_2$ | +3.5 |
| "Freon–112" | "Genetron–112" | CCl$_2$F-CCl$_2$F | +92.8 |
| "Freon–113" | "Genetron–113" | CCl$_2$F-CClF$_2$ | +47.6 |

Particularly outstanding results are obtained with trichlorofluoromethane.

Nucleating fluids

Admixture of a small amount of a normally gaseous fluid with the liquid compositions of this invention, either before the addition of curing agent or simultaneously with the addition of curing agent, results in particularly good foams. The technique of incorporating a small amount of finely divided gas in a liquid prior to expansion thereof is known as nucleation. The nucleating fluid is present only in a relatively small proportion compared to the expansion-providing fluid; it merely provides centers around which a large number of foam bubbles may subsequently be formed by vaporization of the expansion-providing fluid. The nucleating fluid may suitably be air, nitrogen or another inert gas or it may be a compound of the same type as the expansion-providing fluid but which has a low boiling point, e.g. dichlorodifluoromethane. The proportion of nucleating fluid relative to expansion-providing fluid is suitably in the range from 0.1 to 5 mol percent, and generally below 3 mol percent. The volume of the liquid resin mass after ncleation but before expansion due to volatilization of the expansion-providing liquid is suitably from 1.1 to 2 times its volume before nucleation. Preferably it is not above 1.5 times the original volume.

As will be pointed out hereinafter, beating of liquid foamable compositions in air, either manually or by use of a mechanical mixer, as in adding the curing agent, serves to incorporate sufficient air into the liquid to provide adequate nucleation. As an alternative thereto, a small proportion of a low boiling vaporizable liquid such as dichlorodifluoromethane may be incorporated into the total liquid composition. Incorporation of the curing agent into such a mixture may then take place in the absence of added air or similar gas.

Surface active agents

It is sometimes useful to include a surface-active agent in the liquid resin composition. This generally serves to decrease the surface tension of the composition and thereby promote increased expansion, smaller cells and more uniform cell size and texture of the expanded product. Surface-active agents of the non-ionic type are preferred for this use. Very suitable for this purpose are materials which are commercially available under the trademarks "Span" and "Tween." These are, respectively, partial esters of the common fatty acids (lauric, palmitic, stearic and oleic) and "Hexitol" anhydrides (hexitans and hexides) derived from sorbitol ("Spans"), and materials derived from the "Span" products by adding polyoxyethylene chains to the non-esterified hydroxyls ("Tweens"). Good results have been obtained with polyoxyethylene sorbitanmonolaurate ("Tween-20") and polyoxyethylene sorbitanmonostearate ("Tween-60").

Another useful group of surfactants are polyoxyglycols having the following structure:

$$HO-(C_2H_4O)_a-(C_3H_6O)_b-(C_2H_4O)_c-H$$

wherein $b$ is equal to at least 15, and wherein the ethylene oxide portion of the molecule comprises from 16 to 80% of the molecular weight of the material. These compounds are available under the trademark "Pluronics."

Another useful group are the silicone-glycol copolymers.

As has been explained above, it is particularly preferred to include in formulations according to this invention, in place of the above-mentioned conventional surface active agents, at least about 0.5% of a polyglycidyl ester, e.g., an ester of a fatty acid, such as that described under polyepoxide "G" below. This serves the same purpose of improving fineness and evenness of cell structure and still enters as a component into the final resin structure, contributing additional desirable characteristics.

Other materials

The composition of the invention may also include such conventional ingredients as plasticizers, pigments, dyes, fillers, lubricants, etc.

When the polyepoxide employed is a glycidyl polyether, the composition may further contain a fluidizing solvent for said polyether. For this purpose there is used a liquid solvent which boils above about 50° C. at 760 mm. pressure, such as acetone, methylethyl ketone, isophorone, toluene, xylene, ethyl acetate, butyl acetate, chloroform, trichloropropane, and the like, or a mixture of such compounds. The liquid solvent is used in such amount that the composition has a viscosity of about 15 to 500 centipoises at 100° C. Thus, in compositions containing preferred polyethers having a viscosity of about 50 to 300 centipoises at 100° C. it is often desirable to have present about an added 3% to 10% of toluene or other normally liquid solvent for the polyether.

Methods for producing foamed compositions

The methods employed for producing foamed epoxy resin compositions according to this invention will be described in more detail hereinafter. Briefly, a suitable method consists of preparing a separate liquid composite which contains epoxy resin material, volatilizable fluid dissolved therein and any other of the above referred ingredients desired to be included in the foamed resin composition. This liquid mixture is rapidly and completely blended with a fast-acting curing agent and the resulting liquid mass placed in the location where the foamed resin is desired. The viscosity of the expansible liquid compositions of this invention is suitable in the range from 5 to 500 poises, measured at 23° C., depending on the temperature and the mixing method to be employed. A preferred range is from 20 to 60 poises. A range of suitable viscosities of the liquid resin composites prior to adding expansible fluids is from 0.3 to 0.7 poise at 25° C., measured as a 40% by weight solution in monobutylether of ethylene glycol. The surface tension of the expansible mixture is preferably below 45 dynes per centimeter.

The curing reactions which occur upon blending of the curing agent with the composition containing the polyepoxide result in the development of exothermic heat which raises the temperature of the mixture. By choice of proper conditions the curing agent can be added to and blended with the composition so that the temperature, which originally is below the vaporization temperature of the vaporizable fluid, rises above that at which vaporization of the fluid contained in the resin mass occurs, with the result that the fluid vaporizes and so expands the mixture. Since the vaporization of the fluid is in itself endothermic, a stabilization of the temperature of the mixture occurs with the result that the heat released by the curing reaction does not cause an excessive rise in the temperature of the reaction mass. The curing reaction proceeds while the mass is in an expanded and heated condition, the polyepoxide gelling and curing to the desired hard resin during this period. A result of the change in resin composition is that the solubility of the fluid in the resin mass decreases and further vaporization is therefore facilitated both by the temperature of the resin mass and the decreasing solubility of the vaporizable fluid therein.

The procedure for admixing curing agent with foamable resin composition can be completely manual, partly manual, or completely mechanized. For example, when small batches are to be foamed, a small amount of the liquid resin composition is placed into a vessel, e.g., a paper container, a measured amount of curing agent is added and rapidly dispersed in the liquid by vigorous stirring, and the resulting mixture is quickly poured into the place where foam is desired. For very small batches stirring may be manual. For larger batches both measurement of appropriate amounts and stirring may be by machine. For still larger batches or for continuous operation it is preferred to maintain the foamable resin composition and the curing agent in separate tanks of a mixing and dispensing machine, mechanically feed appropriate quantities to a mixing chamber where they are intimately mixed, and promptly discharge the mixture into the place where foam is desired.

In open mixing, a moderate amount of air is incorporated into the mixture. This serves to provide nuclei for proper foaming of the mixture. In machine mixing it is preferred to introduce some inert gas, such as air, into the liquid resin mixture prior to or during admixing of the curing agent, to provide proper nucleation.

In an alternative method of applying the foam resins of this invention, a machine is employed which dispenses the liquid resin mixture through a spray gun as an atomized stream of liquid particles. In such a machine appropriate quantities of foamable resin composition and curing agent are mechanically mixed in a mixing chamber and thereafter discharged into a stream of air or other inert gas which carries the resin to the surface upon which it is desired to apply the foam. The air stream atomizes the resin so that it will be conveyed to the surface in the foam of fine liquid particles. Sufficient air is entrapped in the applied layer of liquid to serve as nuclei for the formation of foam cells. Rapid initiation of the foaming process after deposit of the sprayed liquid prevents the liquid from running or sagging or otherwise assuming a nonuniform thickness. Foam layers of ¾ inch to 1 inch thickness may be applied with a single pass of a spray gun. A plurality of layers of such foams may be applied to a surface, e.g. an industrial vessel requiring insulation.

In spray applications of the liquid expansible compositions of this invention, the liquid composition in the spray machine may be under substantial superatmospheric pressure. Pressures typically are in the range from 400 to 800 p.s.i.g. In spite of the fact that there is a substantial pressure release at the nozzle, the foamable resin is not substantially expanded at that point since the expansion-providing fluid is not above its boiling point. When a low boiling nucleating liquid is present, a small amount of expansion is provided by it.

The initial temperature employed in the preparation of expanded foam is governed by two factors, the vaporization temperature of the vaporizable fluid and the increase in temperature developed by the curing reactions. It is a particular advantage of the present invention that an initial temperature as low as atmospheric temperature, i.e., room temperature (about 20–25° C.) or lower can generally be used with the compositions of this invention. Foamable resin and curing agent are suitably maintained and mixed at temperature between about 0 and 60° C. and preferably between about 15 and 35° C. This is in contrast with the methods for producing expanded epoxy resins according to the prior art, in which thermally decomposable chemicals are employed as internal blowing agents. With these materials it has generally been necessary to prepare the composite of epoxy resins, blowing agent and other material at an elevated temperature, often as high as 100° C., before adding the curing agent which then results in additional heat release and the decomposition of the blowing agent. Thus, while the temperature level at which the gas was released in the prior art composites was generally quite high it is a particular advantage that the present invention permits complete vaporization of vaporizable fluids and thus complete expansion of the resin at relatively low temperatures and does not require preheating of the reaction mixture. If desired, however, a relatively high boiling vaporizable fluid may be selected and employed in the present invention and in such cases it may be desirable to preheat the resin composite before admixing it with the curing agent.

In general, the maximum temperature allowable during the curing process is about 220° C. The formulations are desirably adjusted in such a manner that the maximum temperature reached during curing is about 165° C. in the production of low density foams, e.g., of 1–4 lb./cu. ft., and 190° C. in the production of higher density foams, e.g., those of up to 20 lb./cu. ft. Intermediate temperatures serve best for intermediate foam densities.

Since the temperature at which the resin mass is expanded is relatively low in the process of this invention it may sometimes be desirable to apply heat from external sources to facilitate the final cure of the resin mass. Excellent cure of glycidyl polyethers to hard, solvent-resistant resins is obtained at temperatures between about 75° C. and 250° C.

FOAM PROPERTIES

In general, the foams prepared according to the process of this invention have the following characteristics: The foams are generally of the closed-cell type. Cell size may vary from 0.05 mm. to 3 mm. for normal foams and may range as high as 15 mm. in foams which are highly expanded. The preferred techniques for the preparation of foams produce foams of highly uniform closed-cell structure of about 0.1 mm. size. Foam densities vary from as low as about 1 lb./cu. ft. to 10–20 lb./cu. ft. or more. Thermal conductivities as low as 0.10 to 0.4 B.t.u./hr./° F./sq. ft./in. have been observed in foams prepared according to this invention.

The compressive strength of foams according to this invention is a function of the foam density. For example, foams of a density of about 3 lb./cu. ft. have a typical compressive strength of about 50 p.s.i. Foams of 10 lb./cu. ft. density have a compressive strength of about 250 p.s.i. and foams of 15 lb./cu. ft. density have a compressive strength of about 550 p.s.i.

In the following examples, unless otherwise specified, parts disclosed are parts by weight. Polyepoxides referred to by letters A through F are described under the same designation in U.S. 2,633,458; polyepoxides A, B, D and G through I are described below.

Polyether "A"

About 2 mols of bisphenol (2,2-bis(4-hydroxyphenyl) propane) was dissolved in 10 mols of epichlorohydrin and 1 to 2% water added to the resulting mixture. The mixture was then brought to 80° C. and 4 mols of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal quantity by weight of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product has an epoxy value (eq./100 g.) of 0.50 so the epoxy equivalency was 1.75. For convenience, this product will be referred to hereinafter as polyether A.

Polyether "B"

A solution consisting of 11.7 parts of water, 1.22 parts of sodium hydroxide, and 13.38 parts of bisphenol was prepared by heating the mixture of ingredients to 70° C., and then cooling to 46° C., at which temperature 14.06 parts of epichlorohydrin was added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at 20° C. to 30° C. temperature was started 30 minutes later and continued for 4½ hours. The product was dried by heating to a final temperature of 140° C. in 80 minutes, and cooled rapidly. At room temperature, the product was an extremely viscous semi-solid having a melting point of 27° C. by Durran's Mercury Method and a molecular weight of 483. The product had an epoxy value (eq./100 g.) of 0.40 so the epoxy equivalency was 1.9. For convenience this product will be referred to as polyether B.

Polyether "D"

By using a smaller ratio of epichlorohydrin to bisphenol, a glycidyl polyether of higher melting point was obtained. Thus, polyether D was obtained in the same manner as polyether C except that for every mol of bisphenol, there was used 1:57 mols of epichlorohydrin and 1.88 mols of sodium hydroxide. This provided a product having a melting point of about 70° C., a molecular weight of 900 and an epoxide value of 0.20 eq./100 g.

Polyepoxide "G"

This polyepoxide contains a polyglycidyl ester of a mixture of dimer and trimer of long-chain aliphatic acids. Dimer and trimer acids and their mixtures are well known commercial products and may be prepared, for example, by the process of U.S. 2,482,761. Polyepoxide "G" is the glycidyl ester of a mixture of about 75% of trimer fatty acid and about 25% dimer fatty acid having an epoxy value of 0.242 eq./100 g. and an OH value of 0.019. It is a liquid of uniform composition.

Polyepoxide "H"

Polyepoxide "H" is the reaction product of 75 parts of polyepoxide "G" and 25 parts of polyether "A." It is a liquid of uniform composition.

Polyether "I"

The polyglycidyl ether of 1,1,2,2-tetrakis(hydroxyphenyl)ethane is prepared as in Example 1 of U.S. 2,806,016 to Schwarzer. The resulting product melts at about 85° C. and contains 0.452 epoxy equivalent per 100 grams.

The following formulations are illustrative of the present invention:

RESIN FORMULATIONS

| Formulation Number | 1 | 2 | 3 | 4 | 5 | 6 | 7 |
|---|---|---|---|---|---|---|---|
| Polyether A | 73 | 80 | 40 | 100 | 65 | 10 | 20 |
| Polyether B | | | | | | 85 | |
| Polyether D | | | 45 | | 35 | | 78 |
| Polyepoxide G | 27 | 20 | 15 | | 10 | 5 | 2 |
| CCl$_3$F | 7 | 6 | 22 | 20 | 20 | 18 | 18 |
| Polyoxyethylene Sorbitanmonostearate | 0.05 | | | | | | |
| Dimethyl Dioctadecyl ammonium bentonite | | | | 6 | | | |

CURING AGENT FORMULATIONS

| Formulation Letter | A | B | C | D | E | F |
|---|---|---|---|---|---|---|
| Component: | | | | | | |
| BF$_3$ | 10 | 8 | 8 | | | |
| BF$_3$-Etherate | | | | 17 | 8 | |
| H$_2$O | | 5 | 9 | | | |
| Polyether | 90 | | | | | |
| Polyethylene Glycol I [a] | | | | 83 | | |
| Polyethylene Glycol II [b] | | 87 | 83 | | | |
| Dipropylene Glycol | | | | | 22 | |
| H$_3$PO$_4$ (86%) | | | | | 40 | |
| P$_2$O$_5$ | | | | | 30 | |
| Diethylene Triamine | | | | | | 100 |

[a] Molecular weight about 200.
[b] Molecular weight about 400.

Curing agent "A" is prepared by dissolving BF$_3$ in polyethylene glycol. Curing agent "B" is prepared by admixing the dihydrate of BF$_3$ with polyethylene glycol.

Curing agent "C" is prepared by admixing the dihydrate of BF$_3$ with polyethylene glycol and adding sufficient additional water to produce the desired mixture.

Curing agent "D" is prepared by complexing BF$_3$ with diethyl ether and dissolving the complex in polyethylene glycol.

Curing agent "E" is prepared by adding P$_2$O$_5$ to 86% H$_3$PO$_4$, reacting the product with dipropylene glycol—thus leading to a partial ester of the phosphoric acid—and adding BF$_3$-diethylether complex.

The following examples are further illustrative of the following invention:

EXAMPLE 1

A base mixture was prepared according to Formulation 1 by mixing the specified amounts of polyepoxides and surfactant in an agitated vessel at 75° C., pouring in a weighed amount of CCl$_3$F and stirring the total mixture until it was a uniform solution. This mixture was then ready for use and could be stored until it was desired to prepare the expanded epoxy resin. Immediately prior to the time that the expanded resin was to be prepared a predetermined amount of the base mixture was weighed into a separate blending vessel and 3 parts, per 100 parts of resin, of BF$_3$-complex curing agent Formulation "A" blended into the mixture within a time period of 30 to 60 seconds. Within the next 60 seconds the resulting mixture was poured out of the vessel and into the location where the foam was desired. Foaming initiated in this mixture within 2 minutes from the start of the addition of curing agent and was completed within 5 to 7 minutes from the start of the addition of curing agent. At that point the material was an expanded, gelled, hard foam which had a temperature of about 190° C. The expanded resin continued to cure as long as it was at elevated temperature Densities of cured samples prepared in this manner were approximately 6 lb./cu. ft. where the mixture had been allowed to expand in an unconfined space and about 10 lb./cu. ft. where expansion had occurred in a confined space such as a closed mold. The foams were hard, non-friable resins.

EXAMPLE 2

In the manner described in Example 1 a foam mixture was prepared from Formulation 2 and 2.5 parts per 100 parts of resin, of curing agent A. Foams prepared from this mixture were substantially identical in all respects, including the cell size and distribution, with foams prepared from Formulation 1 according to Example 1.

EXAMPLE 3

Expanded epoxy resins were prepared according to Formulation 3 by the following two methods:

Method I

A mixture of polyethers "A" and "D" was blended at about 70–105° C., the temperature being sufficiently high to assure that the resulting mixture is a liquid. Polyether "A" is normally liquid and polyether "D" is normally solid. The heating was carried out in a heated agitated vessel. Heat was then removed and while the mixture was still at an elevated temperature the required amount of polyepoxide "G" was added to the hot mixture and the mixture was then permitted to cool to about 50–65° C. While the mixture was at this temperature, $CCl_3F$ was slowly stirred into the mixture until the weight of the total resulting solution indicated that the predetermined amount of $CCl_3F$ had been dissolved. This mixture was then further cooled and could be stored until needed.

Method II

A solution of polyethers "A" and "D" was prepared as previously described in an agitated vessel adapted to be placed under pressure. Heat was then removed and the required amount of polyepoxide "G" added and stirred into the solution. The solution was then cooled to about 65° C. and the predetermined amount of $CCl_3F$ was added to the solution under pressure by passing it directly into the liquid. Solution of $CCl_3F$ in the liquid mixture was substantially instantaneous. The resulting liquid mixture could then be cooled to room temperature and stored until needed.

In order to prepare foam from a mixture prepared from Formulation 3 either according to Method I or Method II a predetermined amount of the base mixture prepared as described was weighed into a blending vessel. Four parts, per 100 parts of resin, of curing agent A was then blended into the mixture within a period of 30 seconds and the mixture poured into a mold. Foam began to form within 40–60 seconds of the time of addition of the curing agent and foam production was complete in 3 to 5 minutes from the time of addition of the curing agent. The maximum temperature of the foam at the end of 5 minutes was approximately 165° C.

Foams prepared according to the above method had densities of from 1.5 to 2.5 lb./cu. ft. when permitted to expand in an open space and densities of 1.7 to 3.0 lb./cu. ft. when formed in a restrained space such as a mold. The foams were resilient, tough and non-friable.

In preparing foams according to the above-described method, the time at which foaming is initiated can be delayed from 40 to 80 seconds beyong the time normally obtained by adding 0.15 part by weight of water per 100 parts of resin to the base mixture before addition of the curing agent. Shorter time delays may be obtained by using proportionately less water.

EXAMPLE 4

A foam is prepared in the manner described in Example 1 from Formulation 4 and 12 parts, per 100 parts of resin, of curing agent F. The addition of the curing agent to this foam is most suitably carried out at an elevated temperature between 50 and 100° C. The time required for initiation of the expansion and for completion of expansion is substantially greater than in the previous examples but the amount of thixotropic agent present stabilizes the structure of the foam until it is cured to a gel-like state. A hard but somewhat more friable foam is produced according to this method.

EXAMPLE 5

In the manner described in Example 3, a foam mixture was prepared from Formulation 5 and 2.6 parts per 100 parts of resin of curing agent C. The resin began to foam within 100–120 seconds from the time of addition of curing agent; the foaming process was completed in 3 to 5 minutes from the addition of curing agent. The exotherm and the density within the foam was essentially the same as in the foam in Example 3.

EXAMPLE 6

Foam resin prepared from Formulation 6 with curing agent D has an extremely fast initiation time; it has a lower viscosity than the foam resin of Example 3. As a result, a modification of the foaming procedure of Example 3 is preferred. First the resin and the catalyst are produced as described. Then the combined polyepoxide resins are cooled to 60–65° F. and agitated in air (whipped) for 20–30 seconds. This serves to incorporate some air into the resin, to provide nuclei for subsequent foaming. To the whipped resin is added 2.6 parts per 100 parts of resin of curing agent D, and the resultant mixture of resin plus catalyst blended for an additional 15–20 seconds. Foaming initiates within this mixture within 30 seconds from the time of addition of the curing agent and is complete within 3–5 minutes after the addition of the curing agent. Properties of the foam are nearly identical to the foam in Example 3, except that this foam will have better strength and dimensional stability than the foam produced in Example 3.

EXAMPLE 7

In the manner described in Example 6, a foam mixture is prepared from Formulation 7 and 2.6 phr. of curing agent D. Foams prepared from this mixture are substantially identical in all aspects, including the cell size and distribution, with foams of Example 6.

EXAMPLE 8

In the manner described in Example 6, a foam mixture is prepared from Formulation 6 and 5.2 parts per 100 parts of resin of curing agent E. The initiation of the foam begins within 25 seconds of the time of addition of the curing agent, and the foaming process is complete within 3–5 minutes after adding the curing agent. The maximum temperature of the foam at the end of 5 minutes is approximately 165° C. Foams prepared according to this method have densities from 1.5 to 2.5 pounds per cubic foot when permitted to expand in an open space, and densities of 1.7–3.5 pounds per cubic foot when formed in a restrained space, such as a mold. The foams are tough, resilient, non-friable, and in addition are classified as self-extinguishing by ASTM Method D1692–59T.

EXAMPLE 9

The following two examples, parts I and II, demonstrate the versatility of the foam resin. The same foam formulation (6) and curing agent (E) are used as in Example 8.

*Part A.*—A Martin Sweets foam machine is used to meter, mix and dispense the cooled resin component 6 and the ambient temperature curing agent E at rates of ½ to 20 pounds per minute. Some air is combined with the mixture before it is dispensed, in order to provide adequate nucleation of the foam. The catalyzed resin is dispensed in the nucleated but unfoamed state into a mold. The catalyzed resin subsequently begins to foam, rise, and cure in the mold according to the description of the foaming process in Example 8.

*Part B.*—A Pyles piston metering machine and a Binks model 101–100 turbulator spray gun are used to meter the resin and catalyst; blend the resin plus catalyst; nucleate and atomize the catalyzed resin; and spray the resin on a vertical surface. In this case, neither the resin No. 6 nor the catalyst E are cooled below 75° F. Generally the resin plus catalyst are used at ambient temperature conditions of 85–95° F. It may sometimes be desirable to heat the resin and catalyst to 85–95° F. Layers of foam ¾ inch to 1¼ inch thick are sprayed, using one pass with the gun. After the resin has cured, this spray foam can be cut and repatched with additional spray resin, or sprayed with additional layers of foam in order to build up a multilayered foam of several inches thickness.

It will be evident from the above description that foams having a variety of characteristics can be prepared according to the process of this invention. In particular, foams of desired density between 1 and 10 lb./cu. ft. or higher can be prepared by appropriate modifications of the type of epoxy resin and the amount of vaporizable fluid used in the base mixture.

Foams of relatively high density typified by Examples 1 and 2 suitably are prepared from a base mixture containing 100 parts by weight of a normally liquid glycidyl polyether of 2,2-bis(4-hydroxyphenyl)propane, from 0.5 to 30 parts by weight of polyglycidyl esters including at least 0.5 parts of polyglycidyl esters of a mixture of dimer and trimer of long chain unsaturated acids and from 5 to 25% by weight, based on the total of the components, of trichlorofluoromethane.

Foams of very low density are prepared from formulation of which Example 3 is typical. In general, such foams are prepared from a composite of a normally liquid and a normally solid glycidyl polyether of 2,2-bis(4-hydroxyphenyl)propane, most suitably from a composite containing 100 parts by weight of such a mixture consisting of from 30 to 80 parts by weight of a normally liquid and from 20 to 70 parts by weight of a normally solid compound, from 0.5 to 30 parts by weight of polyglycidyl esters including at least 0.5 parts of polyglycidyl esters of long chain unsaturated acids and from 10 to 40% by weight, based on the total of the components, of trichlorofluoromethane.

Foams having other desired characteristics can be produced in some cases by including components which impart such characteristics. For example, highly flame resistant or flame retardant foams are produced by formulations which contain, in addition to polyethers, such as "A" or "D," a substantial amount of antimony trioxide and of a highly chlorinated organic compound which is capable of entering into the resin structure.

One type of chlorinated material which can be used in fire resistant composition is a polyether in which a chloro-epoxy-substituted alkane, such as epichlorohydrin, supplies the repetitive group. Typically, such a compound is obtained by treating a chloroepoxy-substituted alkane, such as epichlorohydrin, with an acidic condensation catalyst in the presence of a controlled amount of a hydroxy-containing compound, such as water or a glycol, and treating the resulting polymer with an alkaline material. Such a polyether has the typical formula:

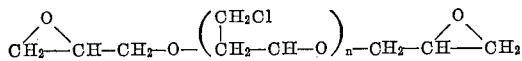

wherein *n* is an integer from 4 to 20.

Another chlorinated material suitable for use in fire retardant compositions is a chlorinated maleic adduct (hexachloroendomethylenetetrahydrophthalic anhydride). Resin compositions incoporating this anhydride are described in U.S. 2,744,845 to Rudoff.

Other chlorinated or brominated compounds which impart fire retardence or nonflammability are the polyglycidyl ethers of brominated or chlorinated bisphenols.

The following are typical formulations which can be used to prepare fire retardant foams according to this invention:

| Component | Formulations (Parts by Weight) | | | |
|---|---|---|---|---|
| | 8 | 9 | 10 | 11 |
| Polyether "A" | 50 | 50 | | |
| Polyether "B" | | | 57 | 57 |
| Polyether "D" | 10 | | | |
| Polyether "I" | | 20 | | |
| Polyepoxide "G" | | | 3 | 3 |
| Polyepichlorohydrin ether | 40 | | | |
| Normally liquid polyglycidyl ether of tetrabromo bisphenol A | | | 40 | 40 |
| Chlorendic Anhydride | | 30 | | |
| $CCl_3F$ | 18 | 18 | 20 | 20 |
| Antimony Trioxide | 13 | 10 | | |
| Curing agent Formulation C | 3.5 | 4 | | |
| Curing agent Formulation D | | | 3 | |
| Curing agent Formulation E | | | | 6 |

Formulations 10 and 11 result in foams having properties similar to those of Examples 6, 7 and 8. By ASTM test D1692–59T, foam according to Formulation 10 is rated as self-extinguishing and that according to Formulation 11 as nonburning.

Numerous modifications of the formulations, methods of preparation and methods of utilization of the foams produced according to this invention will occur to the persons skilled in the art and the invention is limited only by the following claims.

We claim as our invention:

1. The method of forming a foamed resin body which comprises mixing a liquid epoxy resin containing a plurality of terminal epoxy rings, a volatile chlorofluorocarbon that boils at not substantially above room temperature, an emulsifying agent, and a coordination compound of boron trifluoride, the mixture being at a temperature below the boiling point of the chlorofluorocarbon, and allowing the mixture to warm up without application of external heat whereby to foam and cure the same.

2. The method of forming a foamed resin body which comprises forming a mixture of a liquid epoxy resin which is reaction product of epichlorohydrin and 2,2-bias (4-hydroxyphenyl)propane, a chlorofluorocarbon that boils at not substantially above room temperature, an emulsifying agent, and a coordination compound of boron trifluoride, the mixture being at a temperature below the boiling point of the volatile chlorofluorocarbon, and allowing the mixture to warm up without application of external heat whereby to foam and cure the same.

3. The method of forming a foamed resin body which comprises providing a liquid mixture of
   (A) an epoxy resin containing a plurality of terminal epoxy rings,
   (B) a chlorofluorocarbon containing a single carbon atom, and
   (C) as a catalyst of curing, a coordination compound of boron trifluoride, the mixture being at a temperature not substantially above room temperature, and allowing said mixture to foam and cure without application of external heat.

4. The method according to claim 3 wherein the chlorofluorocarbon is selected from the class consisting of $CCl_3F$ and $CCl_2F_2$.

5. The method according to claim 3 wherein the coordination compound is boron trifluoride and a liquid aliphatic alcohol.

6. The method according to claim 3 wherein the epoxy resin is formed by the reaction of 2,2-bis(4-hydroxyphenyl)propane and epichlorohydrin, the chlorofluorocarbon is $CCl_3F$, and the coordination compound for the boron trifluoride is a liquid aliphatic alcohol.

7. The method of producing a foamed epoxy resin which comprises (1) preparing a liquid mixture comprising a resin-forming polyepoxide having an epoxy equivalent greater than 1.0 and as the sole blowing agent a chlorofluorocarbon which is soluble in said liquid mixture at atmospheric temperature and pressure but which vaporizes therefrom at elevated temperatures;

(2) blending with said mixture at substantially atmospheric temperature an epoxy curing agent capable of initiating an exothermic epoxy curing reaction within ten minutes from the time of its blending with said mixture, selected from the group consisting of boron trifluoride; complexes and coordination compounds of boron trifluoride; phosphoric acid; and esters of phosphoric acid;

(3) placing the resulting blend into a location where a resin foam is desired; and (4) permitting said blend to react with release of heat whereby a foam is produced due to vaporization of said blowing agent, and the resin is at least substantially cured due to said reaction.

8. The method according to claim 7 in which said polyepoxide is a polyglycidyl ether of a phenol.

9. The method according to claim 7 in which said polyepoxide is a polyglycidyl ether of an alcohol.

10. The method according to claim 7 in which said polyepoxide comprises an epoxidized ester of an ethylenically unsaturated monohydric alcohol and an ethylenically unsaturated monocarboxylic acid in an amount in the range from 0.5 to about 5% of the total polyepoxide.

11. The method according to claim 7 in which the curing agent is the reaction product of boron trifluoride and polyhydric alcohol.

12. The method according to claim 7 in which said chlorofluorocarbon is trichlorofluoromethane.

13. The method of producing a foamed epoxy resin which comprises (1) preparing a liquid mixture comprising a resin-forming polyepoxide having an epoxy equivalent greater than 1.0 and as sole blowing agent a chlorofluorocarbon which is soluble in said liquid mixture at atmospheric temperature and pressure but which vaporizes therefrom at elevated temperatures;

(2) blending with said mixture at substantially atmospheric temperature
  (a) an amount of gas sufficient to nucleate such mixture and
  (b) an epoxy curing agent capable of initiating an exothermic epoxy curing reaction within ten minutes from the time of its blending with said mixture, selected from the group consisting of boron trifluoride; complexes and coordination compounds of boron trifluoride; phosphoric acid; and esters of phosphoric acid;

(3) placing the resulting blend into a location where a resin foam is desired; and (4) permitting said blend to react with release of heat whereby a foam is produced due to vaporization of said blowing agent and the resin is at least substantially cured due to said reaction.

14. The method of producing a foamed epoxy resin which comprises (1) preparing a liquid mixture comprising a resin-forming polyepoxide having an epoxy equivalent greater than 1.0 and as sole blowing agent of chlorofluorocarbon which is not reactive with the remaining components of the mixture and which is completely soluble in said liquid mixture at atmospheric temperature and pressure but which vaporizes therefrom at elevated temperatures, (2) blending boron trifluoride with said mixture at substantially atmospheric temperature as catalyst of curing, the water content of the combined blend being maintained at a value not above 0.10 percent by weight based on the total mixture, (3) placing the blend into a space where a resin foam is desired, (4) permitting said blend to react with release of heat, whereby a foam is produced due to vaporization of said fluid, and (5) curing said foam.

15. The method of producing a foamed epoxy resin which comprises (1) preparing a liquid mixture comprising a resin-forming polyepoxide having an epoxy equivalent greater than 1.0 and as sole blowing agent a chlorofluorocarbon which is not reactive with the remaining components of the mixture and which is completely soluble in said liquid mixture at atmospheric temperature and pressure but which vaporizes therefrom at elevated temperatures, (2) blending with said mixture at substantially atmospheric temperature as catalyst of curing a coordination compound of boron trifluoride capable of initiating an exothermic epoxy curing reaction within ten minutes from the time of its blending with said mixture, the water content of the combined blend being maintained at a value not above 0.10 percent by weight based on the total mixture, (3) placing the blend into a space where a resin foam is desired, (4) permitting said blend to react with release of heat, whereby a foam is produced due to vaporization of said fluid, and (5) curing said foam.

16. As a composition of matter a cured low-density epoxy resin foam whose solid phase contains as its essential resin component the product of expanding and curing a liquid mixture comprising a resin-forming polyepoxide having an epoxy equivalent greater than 1.0 and, as blowing agent, a chlorofluorocarbon, by blending it with a curing agent capable of initiating an epoxy curing reaction within ten minutes from the time of its blending with said mixture, said curing agent being selected from the group consisting of boron trifluoride; complexes and coordination compounds of boron trifluoride; phosphoric acid; and esters of phosphoric acid.

17. As a composition of matter a cured low-density epoxy resin foam whose solid phase contains as its essential resin component the product of rapidly admixing (A) a liquid composition which has a viscosity in the range from 5 to 400 poises at 23° C. and which consists essentially of (1) 100 parts by weight of a liquid mixture of polyglycidyl polyethers of 2,2-bis(4-hydroxyphenyl)propane, said mixture having an average epoxide value in the range from 0.25 to 0.50 equivalent per 100 grams;

(2) from 0.5 to 3 parts of polyglycidyl esters of organic acids comprising at least 0.5 part of polyglycidyl esters of long chain, ethylenically unsaturated aliphatic hydrocarbon acids selected from the group consisting of the dimers and trimers of long chain unsaturated aliphatic hydrocarbon acids and mixtures of said dimers and trimers; and (3) from 5 to 35 parts by weight of chlorofluorocarbon boiling in the range from −30° to 60° C.; with (B) a curing agent from the group consisting of polyethylene glycol solution of $BF_3$, $BF_3 \cdot 2H_2O$ and $BF_3$-etherate, under conditions controlled to maintain the total water content of the total mixture in the range from 0.05 to about 0.08% of the mixture.

18. As a composition of matter a cured low-density self-extinguishing epoxy resin foam whose solid phase contains as its essential resin component the product of rapidly admixing (A) a liquid composition which has a viscosity in the range from 5 to 400 poises at 23° C. and which consists essentially of
  (1) 100 parts by weight of a liquid mixture of polyglycidyl polyethers of 2,2-bis(4-hydroxyphenyl)propane, said mixture having an average epoxide value in the range from 0.25 to 0.50 equivalent per 100 grams;
  (2) from 0.5 to 3 parts of polyglycidyl esters of organic acids comprising at least 0.5 part of polyglycidyl esters of long chain, ethylenically unsaturated aliphatic hydrocarbon acids selected from the group consisting of the dimers and trimers of long chain unsaturated aliphatic hydrocarbon acids and mixtures of said dimers and trimers; and
  (3) from 5 to 35 parts by weight of chlorofluorocarbon boiling in the range from −30° to 60° C.; with (B) a curing agent consisting essentially of phosphoric acid, partially esterified with dipropylene glycol.

References Cited by the Examiner

UNITED STATES PATENTS

| | | | |
|---|---|---|---|
| 2,739,134 | 3/1956 | Parry et al. | 260—2.5 |
| 2,759,901 | 8/1956 | Greenlee | 260—42 |
| 2,831,820 | 4/1958 | Aase et al. | 260—2.5 |
| 2,927,931 | 3/1960 | Phillips et al. | 260—78.3 |
| 2,940,986 | 6/1960 | Newey | 260—42 |

FOREIGN PATENTS

| | | |
|---|---|---|
| 758,562 | 10/1956 | Great Britain. |
| 783,956 | 10/1957 | Great Britain. |
| 575,012 | 4/1959 | Canada. |

MURRAY TILLMAN, *Primary Examiner.*

LEON J. BERCOVITZ, *Examiner.*

M. FOELAK, *Assistant Examiner.*